UNITED STATES PATENT OFFICE.

CARL BOSCH, OF LUDWIGSHAFEN-ON-THE-RHINE, GERMANY, ASSIGNOR, BY MESNE ASSIGNMENTS, TO THE CHEMICAL FOUNDATION, INC., A CORPORATION OF DELAWARE.

MANUFACTURE OF UREA AND OF INTERMEDIATE PRODUCTS.

1,344,673.   Specification of Letters Patent.   Patented June 29, 1920.

No Drawing.   Application filed January 21, 1915. Serial No. 3,559.

*To all whom it may concern:*

Be it known that I, CARL BOSCH, citizen of the German Empire, residing at Ludwigshafen-on-the-Rhine, Germany, have invented new and useful Improvements in the Manufacture of Urea and of Intermediate Products, of which the following is a specification.

The value of urea as a fertilizer is being more and more fully recognized. As is well known this compound can be prepared by heating ammonium carbamate in a closed vessel, but experiments conducted with the object of manufacturing urea by this reaction proved that it is difficult or impossible to manufacture the ammonium carbamate required according to the methods hitherto known.

According to the present invention ammonium carbamate or a mixture of this body with ammonium carbonate can readily be manufactured by bringing together ammonia and carbonic acid, $CO_2$, under pressure, such pressure amounting preferably to three or more atmospheres. This can be done by introducing into a vessel capable of withstanding the pressure at which it is desired to effect the reaction ammonia and carbonic acid either in the gaseous state or one of them or both in the liquefied form, both being introduced either simultaneously, or better successively. The temperature rises and when means are taken to check it by suitable cooling it is not possible even in large apparatus, and when introducing gases fast, to prevent dangerous pressure arising. Mixtures of ammonium carbamate with ammonium carbonate or ammonium carbonate as the sole product can be obtained if the reaction is performed in the presence of water, the proportion of which, if mixtures of ammonium carbamate and ammonium carbonate are to be formed should not surpass that of one molecule to one molecule of the carbonic acid employed. A part of the carbonic acid or the whole can be introduced into the apparatus in the form of a compound capable of parting with carbonic acid, in particular of ammonium bicarbonate, or of a mixture containing this salt.

If it is desired to convert the ammonium carbamate into urea at once, the conversion can be effected in the same vessel and the heat of formation of the ammonium carbamate can be utilized for its conversion into urea.

This process renders the manufacture of urea and ammonium carbamate possible on the large scale in a small space and without loss of ammonia and carbonic acid.

The following examples serve to further illustrate the nature of the invention, but the invention is not confined to the examples.

*Example 1.*

Take an autoclave capable of withstanding great pressure, and which is lined with lead or which is silvered, and furnished with means for cooling and heating and with the necessary inlet and outlet pipes. Pump into this gaseous ammonia or fill in liquid ammonia. Introduce while cooling sufficient carbon dioxid for the formation of the ammonium carbamate. If it is desired to manufacture ammonium carbamate as the end product—for which purpose the temperature should during the reaction not surpass about 100 to 110° centigrade—the vessel is allowed to cool, whereupon the contents form a solid mass of ammonium carbamate. If it is desired to convert the product at once into urea, the cooling is only carried so far that the pressure does not substantially surpass that of the subsequent treatment to form urea, viz. about thirty to fifty atmospheres, and after the substances are mixed the temperature is maintained at about 130 to 140 degrees until no further conversion into urea takes place.

*Example 2.*

Introduce liquid ammonia into a vessel capable of withstanding pressure, and then from 10 to 20% of its weight of water, and finally pump into the vessel the quantity of carbon dioxid necessary for the conversion of ammonia into ammonium carbamate. If desired the water need not be introduced into the vessel separately but together with either of the other materials.

*Example 3.*

Introduce solid ammonium bicarbonate (say seventy-nine pounds) and the requisite quantity of ammonia (seventeen pounds) into a vessel capable of withstanding pressure, and heat the mixture while stirring, to about 50 to 100 degrees centigrade. Ammonium carbamate and water are formed, and there may be an admixture of ammonium carbonate. If desired the mixture can be immediately converted into urea as above described. Water may be added when worked according to this example, so that, for instance, instead of the liquid ammonia, or a part of it, concentrated aqueous ammonia may be used. In this case, more or less ammonium carbonate is formed, besides ammonium carbamate, indeed, ammonium carbonate may be the sole product.

I claim:—

1. The manufacture of ammonium carbamate by bringing together ammonia and carbonic acid under pressure of three atmospheres or more.

2. The manufacture of ammonium carbamate which consists in bringing together, under pressure of three or more atmospheres, ammonia and ammonium bicarbonate.

3. The manufacture of ammonium carbamate which consists in bringing together ammonia and carbon dioxid at a pressure of three atmospheres or more and ammonium bicarbonate.

4. The manufacture of urea by first preparing ammonium carbamate by bringing together ammonia and carbonic acid under pressure whereupon the still hot reaction mass is maintained at about 130 to 140 degrees centigrade, until no further conversion into urea takes place.

In testimony whereof I have hereunto set my hand in the presence of two subscribing witnesses.

CARL BOSCH.

Witnesses:
ARTHUR DENONVILLE,
ROHAMES FEHMEL.